(12) United States Patent
Pfeifle

(10) Patent No.: US 8,996,501 B2
(45) Date of Patent: Mar. 31, 2015

(54) OPTIMALLY RANKED NEAREST NEIGHBOR FUZZY FULL TEXT SEARCH

(75) Inventor: Martin Pfeifle, Seewald (DE)

(73) Assignee: HERE Global B.V., Veldhoven (NL)

( * ) Notice: Subject to any disclaimer, the term of this patent is extended or adjusted under 35 U.S.C. 154(b) by 71 days.

(21) Appl. No.: 13/314,412

(22) Filed: Dec. 8, 2011

(65) Prior Publication Data

US 2013/0151503 A1    Jun. 13, 2013

(51) Int. Cl.
G06F 7/00 (2006.01)
G06F 17/30 (2006.01)
G06F 13/14 (2006.01)

(52) U.S. Cl.
CPC .... G06F 17/30675 (2013.01); G06F 17/30542 (2013.01)
USPC .......................................................... 707/716

(58) Field of Classification Search
USPC ......... 707/803, 602, 728, 737, 760, 769, 780, 707/610, 706, 716, 812; 715/234; 365/200; 705/2
See application file for complete search history.

(56) References Cited

U.S. PATENT DOCUMENTS

| | | | |
|---|---|---|---|
| 6,636,849 B1 | 10/2003 | Tang et al. | |
| 8,280,723 B1* | 10/2012 | Laaser | 704/10 |
| 2007/0260595 A1* | 11/2007 | Beatty et al. | 707/5 |
| 2010/0070542 A1* | 3/2010 | Feinsmith | 707/812 |
| 2010/0198612 A1* | 8/2010 | Streepy, Jr. | 705/2 |
| 2011/0106814 A1 | 5/2011 | Okato et al. | |
| 2011/0320481 A1* | 12/2011 | Huang | 707/769 |
| 2012/0166403 A1 | 6/2012 | Kim et al. | |
| 2013/0054927 A1 | 2/2013 | Raj et al. | |

FOREIGN PATENT DOCUMENTS

| | | |
|---|---|---|
| EP | 1197885 | 4/2002 |
| WO | WO 2008/043582 | 4/2008 |

OTHER PUBLICATIONS

Search Report and Written Opinion for related European Application PCT/EP2012/072547 mailed Mar. 14, 2013.
Search Report and Written Opinion for related European Application PCT/EP2012/072546 mailed Mar. 14, 2013.

* cited by examiner

*Primary Examiner* — Usmaan Saeed
*Assistant Examiner* — Cecile Vo
(74) *Attorney, Agent, or Firm* — Lempia Summerfield Katz LLC

(57) ABSTRACT

A method and system for fuzzy full text search is disclosed. The system includes an inverted index where tokens are organized in a Next Valid Character (NVC) tree. Each path through the tree defines a token. The document sets for the tokens are stored at leaf nodes. After receiving search tokens, the system traverses the NVC tree in a lazy manner by exploring paths through nodes associated with the smallest edit distance. The system provides a result set per edit distance. For example, the system provides a result set of document identifiers associated with documents having the least amount of error first, followed by result sets of document identifiers associated with documents that have progressively more error.

16 Claims, 5 Drawing Sheets

OPTIMALLY RANKED NEAREST NEIGHBOR FUZZY FULL TEXT SEARCH

REFERENCE TO RELATED APPLICATIONS

The present patent application is related to co-pending patent application Ser. No. 13/314,416, entitled "FUZZY FULL TEXT SEARCH," filed on Dec. 8, 2011.

FIELD

The present invention relates generally to full text search, and more particularly, relates to fuzzy full text search that provides results in an iterative manner.

BACKGROUND

Full text search (FTS) systems search for relevant documents based on key words entered by a system user. The user enters a set of terms, referred to as tokens, and the FTS system finds documents containing all of the terms in the set. In order to support queries efficiently, the FTS system typically uses inverted indexes. For example, Lucene (described at http://lucene.apache.org/) and SQLite's FTS module (described at http://www.sqlite.org/cvstrac/wiki?p=FtsUsage) are both FTS systems that use inverted indexes.

An inverted index assigns a set of document identifiers to each token. The document identifiers are associated with documents that include the token at least once. Upon receiving a search request, the FTS system selects the set of document identifiers for each token in the request and then compares the document sets to each other. If a document identifier is contained in all document sets, the FTS system provides the document identifier in a result set of all identifiers contained in all document sets.

From a logical point of view, the inverted index can be regarded as a relation InvertedIndex(Term, DocID) with a combined index on Term and DocId. If a user of the FTS system enters the token "Neuschwanstein," the inverted index allows the FTS system to efficiently execute queries such as the following query.

SELECT DocID FROM InvertedIndex WHERE Term='Neuschwanstein' However, if the user misspells "Neuschwanstein," SQLite's FTS system will not find any relevant documents. That is because SQLite's FTS system does not support fault-tolerant (or fuzzy) searching.

Lucene's FTS system does support fuzzy search. However, Lucene performs a fuzzy search in two steps. First, Lucene searches for tokens stored in the database that are similar to the query tokens. To determine if tokens are similar, Lucene computes an edit distance (also referred to as a Levenshtein Distance) from the query tokens to the tokens stored in the database. Second, Lucene uses the similar tokens it finds as new query tokens to retrieve relevant documents.

SUMMARY

A method and system for performing a fuzzy full text search that provides results in an iterative manner is described. The system uses an inverted token Next Valid Character (NVC) tree to identify documents relevant to entered search tokens. Each path through the tree defines a token. Document sets for the tokens are stored in leaf nodes.

A user provides the system with search tokens. The system initially provides document identifiers for documents that include terms with the same spelling as the search tokens (if any). Then the system provides document identifiers for documents that include terms that are within an edit distance of one from the search terms (if any). Then the system provides document identifiers for documents that include terms that are within an edit distance of two from the search terms (if any), and so on. As a result, the user receives the most relevant documents first.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
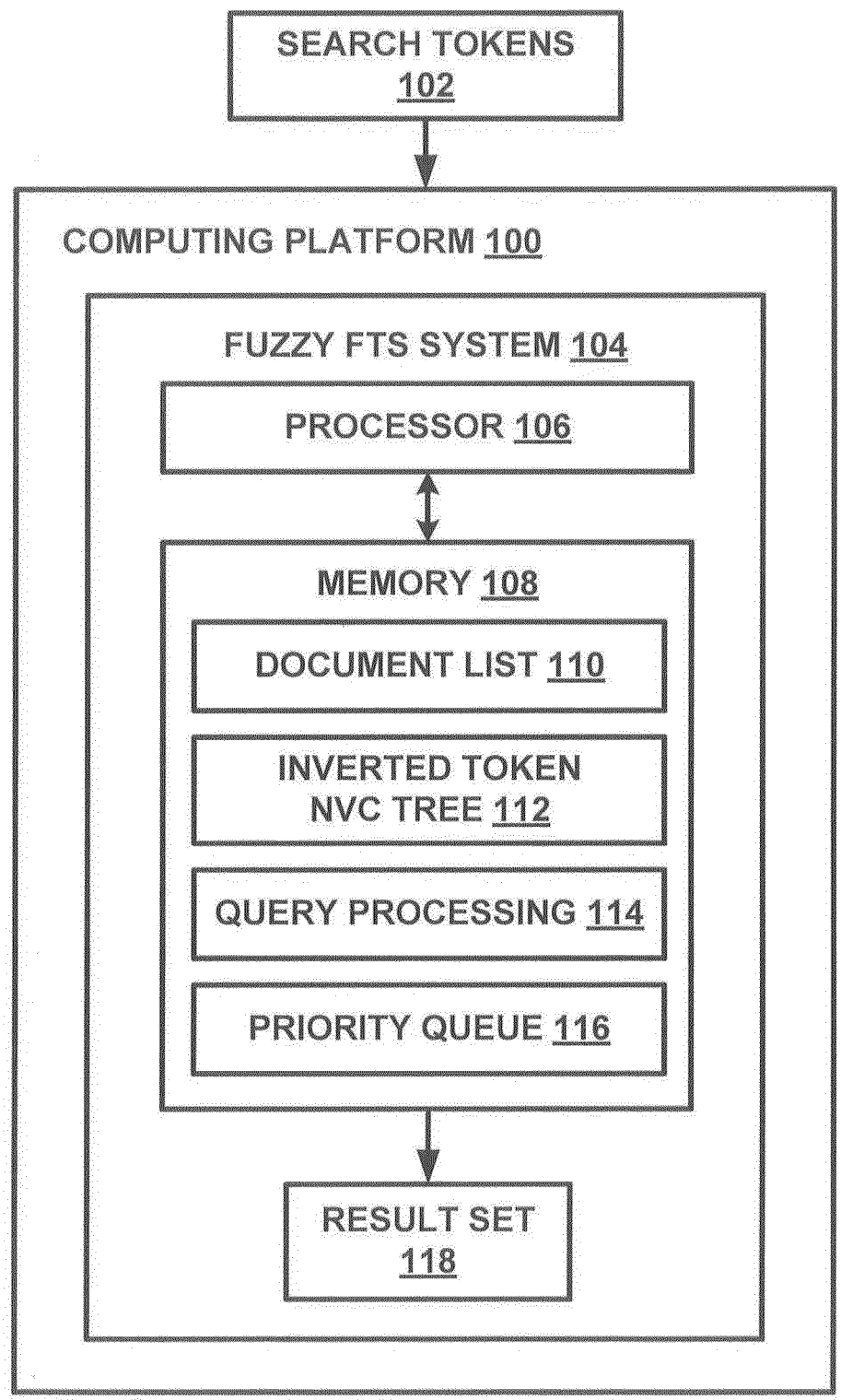
FIG. 1 is a block diagram of a computing platform having a fuzzy full text search system, according to an example.

FIG. 1 depicts a block diagram of a computing platform 100. The computing platform 100 may be a mobile telephone, a navigation system, a tablet computer, a personal computer, or any other computer. The computing platform 100 is a combination of hardware and software components.

The computing platform 100 includes a fuzzy Full Text Search (FTS) system 104. The computing platform 100 may also include other sub-systems. For example, if the computing platform 100 is a navigation system, the computing platform 100 may also include a positioning system, a user interface, a geographic database, and software that facilitates destination entry, route calculation, route guidance, map display, and other navigation functions and features.

The fuzzy FTS system 104 may be a combination of hardware and software components. For example, the fuzzy FTS system 104 includes a processor 106 and memory 108 for storing a document list 110, an index 112, query processing 114, a priority queue 116, and possibly other information. In other examples, the fuzzy FTS system 104 may be a software system and use a processor and memory associated with the computing platform 100.

The computing platform 100 receives search tokens 102 entered by a user of the platform 100 and provides the search tokens 102 to the fuzzy FTS system 104. For example, a user of a navigation system may enter search terms associated with an address to identify a destination. As a result of the query processing 114, the fuzzy FTS system 104 provides a result set 118 as an output. The navigation system may use this result set to provide a list of relevant destinations to the user.

The document list 110 is a list of document identifiers and tokens located within documents associated with the identifiers. The term "document" in this context means any kind of electronic data record or file that contains text. In the example of a navigation system, relevant documents may be a segment record, a node record, a point of interest record, or any other record stored in a geographic database.

The document list 110 includes a document identifier column and a token column. The document identifier column includes data representing document identifiers. Document identifiers may be any combination of letters, numbers, and other characters. The document identifiers reference documents that may be stored in the memory 108. Alternatively, the documents may be stored elsewhere on the computing platform 100 or on another system.

The token column includes terms located in the document associated with a document identifier. Each term in the token column may be used as a search token.

The document list 110 may be stored in memory 108 as a sequence of document identifiers. As another example, the document list 110 may be stored in memory 108 as a bit vector. The length of the bit vector is equal to the number of documents identified in the document identifier column. If a term is located in a certain document, the bit vector includes a 1-Bit and if the term is not located in that document, the bit vector includes a 0-Bit (or vice versa). If the document list 110 is stored as a bit vector, the intersection of document lists may be performed by intersecting the bit vectors.

Figure 2:
FIG. 2 is a document list, according to an example.

FIG. 2 depicts an example document list 200. In this example, the document list 200 includes a document identifier column 202 and an address column 204. The document identifiers in the document identifier column 202 are associated with terms in an address. For example, document identifier 5 is associated with the terms "Garmin," "Kansas," "City," and "USA."

The document list 200 may be used by a navigation system or an on-line mapping application during destination search. Other document lists may include terms relevant for other types of computing platforms and/or applications. For example, the token column may include data regarding books, music, web pages, files, and so on.

Figure 3:
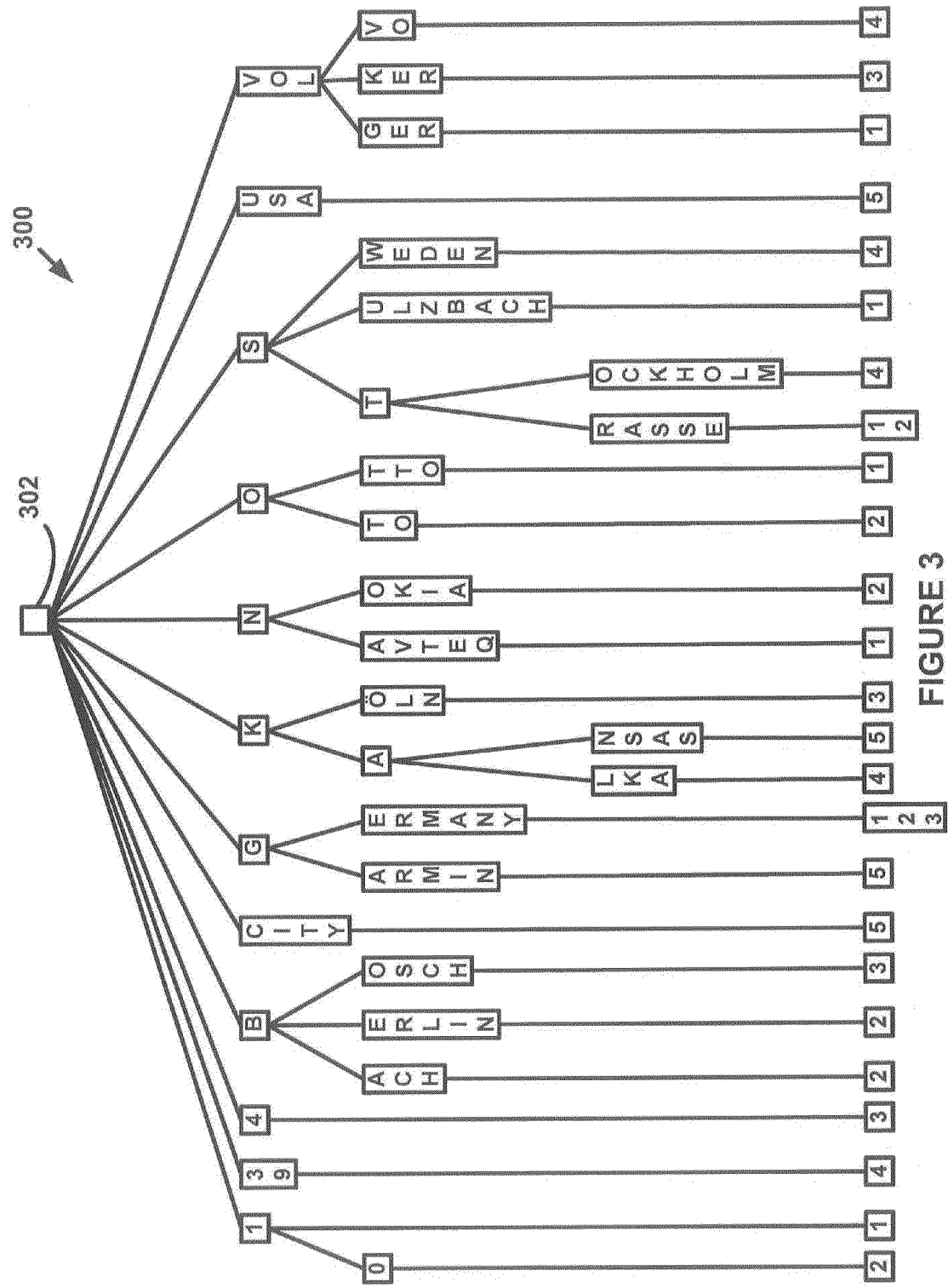
FIG. 3 is an inverted index where tokens are organized in a Next Valid Character (NVC) tree, according to an example.

Returning to FIG. 1, the index 112 is an inverted token Next Valid Character (NVC) tree. FIG. 3 depicts an index 300 where tokens are organized in a NVC tree using the document list 200 depicted in FIG. 2.

The node 302 in the tree 300 is the root node, which is also referred to as the starting node. Branches extend from the root node 302 to additional nodes. The root node 302 is the parent node to the next layer of nodes (i.e., nodes 1, 39, 4, B, CITY, G, K, N, O, S, USA, VOL), which are referred to as children nodes. In some cases, the children nodes are parent nodes to other nodes. For example, the B node is the parent node to the ACH, ERLIN, and OSCH nodes.

After following the paths from the root node through the branches and other nodes, the paths end at leaf nodes. Leaf nodes are nodes without children and are sometimes referred to as end nodes. At each leaf node is a set of document identifiers. In this example, the leaf nodes refer to the document identifiers in FIG. 2. A path from the root node 302 to a leaf node defines a token. In this example, each token is a token from the address column 204 of the document list 200.

For example, assume that a user enters the search terms OTTO, VOLGER, and GERMANY into the computing platform 100. Using the index 300, the path from the root node 302 to a leaf node for the token OTTO results in a leaf node associated with document identifier 1. Similarly, the VOLGER path ends at a leaf node associated with document identifier 1 and the GERMANY path ends at a leaf node associated with document identifiers 1, 2, and 3.

Returning to FIG. 1, the index 112 may be stored in memory 108 in a file or as a set of files. Alternatively, the index 112 may be stored in memory 108 as a relation containing a binary large object (BLOB). A BLOB is a collection of binary data stored as a single entity in a database management system. As both files and BLOBs can become large, the index 112 may be split into several smaller files or BLOBs. The files are stored in a file system, while the BLOBs are stored in one or more relational tables.

The index 112 may also be stored in a relation, such as NVC(FatherNode integer, SonNode integer, SonData BLOB). In this example, the father and son node values are integer values describing the NVC tree structure. The SonData values are the prefixes stored in the NVC tree. If a node is a leaf node, the SonNode value is null (or 0 if null values are not allowed in a column belonging to the primary key). If a node is a leaf node, SonData value is the document list. An example NVC relation for the index 300 is shown as follows.

| FatherNode | SonNode | SonData |
| --- | --- | --- |
| 1 | 2 | "1" |
| 1 | 3 | "39" |
| 1 | 4 | "4" |
| 1 | 5 | "B" |
| ... | ... | ... |
| 1 | 12 | "VOL" |
| 2 | 13 | "0" |
| 2 | NULL | 1 |
| ... | ... | ... |

If the NVC tree is stored in a relation, the traversal through the tree is performed using SQL statements or other appropriate syntax.

The query processing 114 may be embodied as program instructions stored on a non-transitory computer-readable medium, which when executed by the processor 106 cause the processor 106 to carry out functions as described further herein. The program instructions may be written in a suitable computer programming language, such as C, C++, Java, or any other suitable program language now known or later developed.

The query processing 114 performs a fuzzy search for document identifiers based on the entered search tokens. A fuzzy search is a fault tolerant search that allows misspelled search tokens to be used to find relevant document identifiers despite the error. The error is defined as an edit distance, which is also referred to as Levenshtein distance. The Levenshtein distance between two tokens is defined as the minimum number of edit operations needed to transform one token into the other. The allowable edit operations are insertion, deletion, or substitution of a single character.

For example, the Levenshtein distance between "kitten" and "sitting" is three since it takes the following three edits to change "kitten" into "sitting" and there is no way to make the transformation with fewer than three edits.

kitten→sitten (substitution of 'k' by 's')
sitten→sittin (substitution of 'e' by 'i')
sittin→sitting (insert 'g' at the end).

The query processing 114 performs a fuzzy full text search using a ranked nearest neighbor query. A ranked nearest neighbor query retrieves document identifiers for documents that have the smallest edit distance in an incremental manner. Thus, the query processing 114 initially retrieves document identifiers for documents that include terms with an edit distance of zero from the search tokens, if any. Then, the query processing 114 retrieves document identifiers for documents that include terms with an edit distance of one from the search terms, if any. Then, the query processing 114 retrieves document identifiers for documents that include terms with an edit distance of two from the search terms, if any, and so on.

To perform the ranked nearest neighbor query, the query processing 114 uses the priority queue 116. The priority queue 116 tracks the nodes in the index 112 and associated edit distances during a fuzzy full text search performed by the fuzzy FTS system 104. As described with respect to FIGS. 4 and 5, the priority queue 116 may track different data depending on whether a single search token or multiple search tokens are provided to the fuzzy FTS system 104. For example, for a single search token, the priority queue 116 tracks the edit distance between nodes in the index 112 and the search token. For multiple search tokens, the priority queue 116 tracks an overall edit distance of currently explored nodes in the index 112 and the multiple search tokens.

Figure 4:
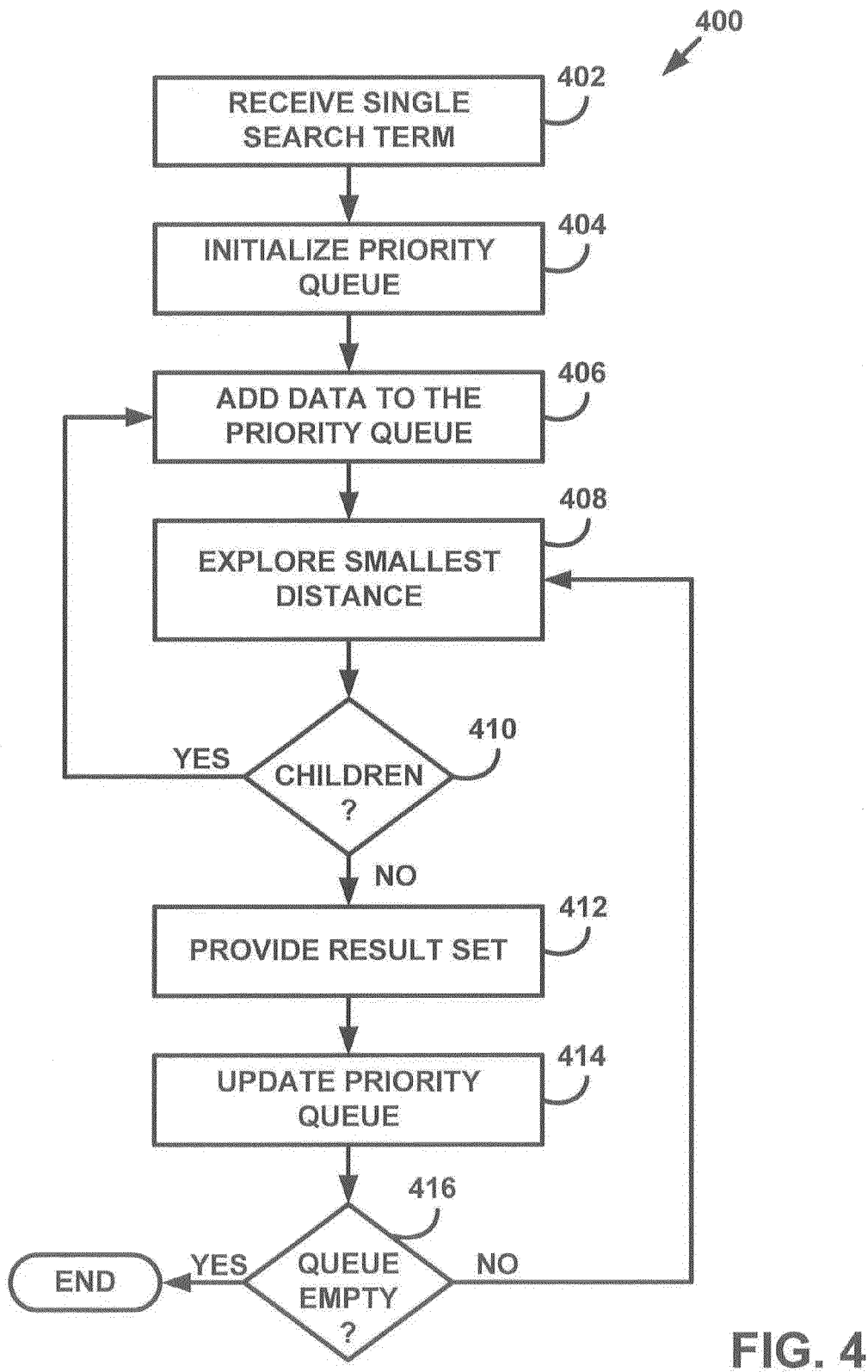
FIG. 4 is a flow diagram of a method of performing a fuzzy full text search with one search token using the fuzzy full text search system depicted in FIG. 1, according to an example.

FIG. 4 is a flow diagram of a method 400 of performing a fuzzy full text search with a single token using the fuzzy FTS system 104. At block 402, the fuzzy FTS system 104 receives a single search token. For example, a user enters the term OTTO into the computing platform 100.

At block 404, the fuzzy FTS system 104 initializes the priority queue 116. Alternatively, the fuzzy FTS system 104 initializes the priority queue 116 prior to receiving the search token. For example, the fuzzy FTS system 104 may initialize the priority queue 116 upon completion of the previous search. With initialization, the query processing 114 stores the root node and an edit distance of zero in the priority queue 116.

At block 406, the query processing 114 adds data to the priority queue 116. Initially, the query processing 114 explores the paths in the index 112 from the root node to the children nodes of the root node. The query processing 114 places each of the children nodes in the priority queue 116 with an associated edit distance from the search token. The nodes are ordered in the priority queue 116 from smallest edit distance to largest edit distance. Using the example depicted in FIG. 3, the query processing 114 inserts the nodes and edit distances into the priority queue 116 as follows.

| NODE | DISTANCE |
|---|---|
| O | 0 |
| 1 | 1 |
| 4 | 1 |
| B | 1 |
| G | 1 |
| K | 1 |
| N | 1 |
| S | 1 |
| 39 | 2 |
| VOL | 2 |
| CITY | 3 |
| USA | 3 |

At block 408, the query processing 114 explores paths from the nodes in the priority queue 116 having the smallest edit distance. At block 410, the query processing 114 determines whether the nodes with the smallest edit distance have children nodes. In this example, the O node has the smallest edit distance and it has two children nodes, the TO node and the TTO node.

If there are children nodes, the query processing 114 returns to block 406, removes the parent node entry, and adds the children nodes and associated edit distances to the search token to the priority queue 116. The children nodes are added to the priority queue 116 in the order of smallest edit distance. In this example, the priority queue 116 now includes the following data.

| NODE | DISTANCE |
|---|---|
| TTO | 0 |
| TO | 1 |
| 1 | 1 |
| 4 | 1 |
| B | 1 |
| G | 1 |
| K | 1 |
| N | 1 |
| S | 1 |
| 39 | 2 |
| VOL | 2 |
| CITY | 3 |
| USA | 3 |

At block 408, the query processing 114 explores the nodes in the priority queue 116 having the smallest edit distance, which is the node TTO in this example. At block 410, the query processing 114 determines whether the nodes with the smallest edit distance have children nodes. In this example, the TTO node is not connected to a child node. Instead, the TTO node is connected to a leaf node.

At block 412, the query processing 114 provides a result set. The query processing 114 obtains the document set associated with the leaf node and provides the document set and the associated edit distance to another entity, which may then retrieve the documents associated with the document identifiers in the document set. Alternatively, the fuzzy FTS system 104 may include programming to retrieve and provide the documents. The documents may be stored on the computing platform 100 or another system. In this example, the query processing 114 provides document identifier one with zero errors (i.e., edit distance equal to zero).

A document identifier may have been previously provided during a previous iteration through the priority queue 116. In this scenario, the query processing 114 does not provide the document identifier. If there is only one document identifier in the document set associated with the leaf node, then the query processing 114 does not provide an output. If there are multiple document identifiers in the document set associated with the leaf node, then the query processing 114 provides only those document identifiers that have not been previously provided.

At block 414, the query processing 114 updates the priority queue 116. To update the priority queue 116, the query processing 114 removes the entry in the priority queue 116 whose leaf node was reached during exploration of the paths at blocks 408, 410. In this example, the priority queue 116 now includes the following data.

| NODE | DISTANCE |
|---|---|
| TO | 1 |
| 1 | 1 |
| 4 | 1 |
| B | 1 |
| G | 1 |
| K | 1 |
| N | 1 |
| S | 1 |
| 39 | 2 |
| VOL | 2 |
| CITY | 3 |
| USA | 3 |

At block 416, the query processing 114 determines whether the priority queue 116 is empty. If the priority queue 116 is empty, the query processing 114 ends. The query processing 114 may also end based on search threshold values. For example, the query processing 114 may end after a certain number of documents identifiers have been provided. As another example, the query processing 114 may end after a threshold edit distance is reached.

In this example, the priority queue 116 is not empty so the query processing 114 returns to block 408 to explore paths from the nodes in the priority queue 116 having the smallest edit distance. In this example, the query processing 114 explores the paths from the TO node, determines that the TO node is connected to the leaf node associated with a document set containing document identifier two. If not previously provided, the query processing 114 provides document identifier two with one error, removes the TO entry from the priority queue 116, and continues iterating through the process of identifying relevant document identifiers.

In a navigation system example, the query processing 114 may provide document identifier one to a destination search application, which then retrieves data from a geographic database associated with the navigation system. The destination search application may then display the address "NAVTEQ, OTTO-VOLGER-STRASSE 1, SULZBACH, GERMANY" on the user interface of the navigation system. The query processing 114 may then provide document identifier two to the destination search application, which then retrieves and displays the address "NOKIA, OTO-BACH STRASSE 10, BERLIN, GERMANY" on the user interface of the navigation system.

Thus, the user of the navigation system first sees the address associated with the fewest number of errors from the entered search token, followed by the address associated with the next fewest number of errors from the search token, and so on. The query processing 114 generates the result set in a lazy way, which means that only those nodes in the index 112 are accessed that are necessary to return document identifiers associated with the smallest edit distance. This process may also be described as a cursor driven mode where the result set changes as the user enters new or revised search tokens.

Figure 5:
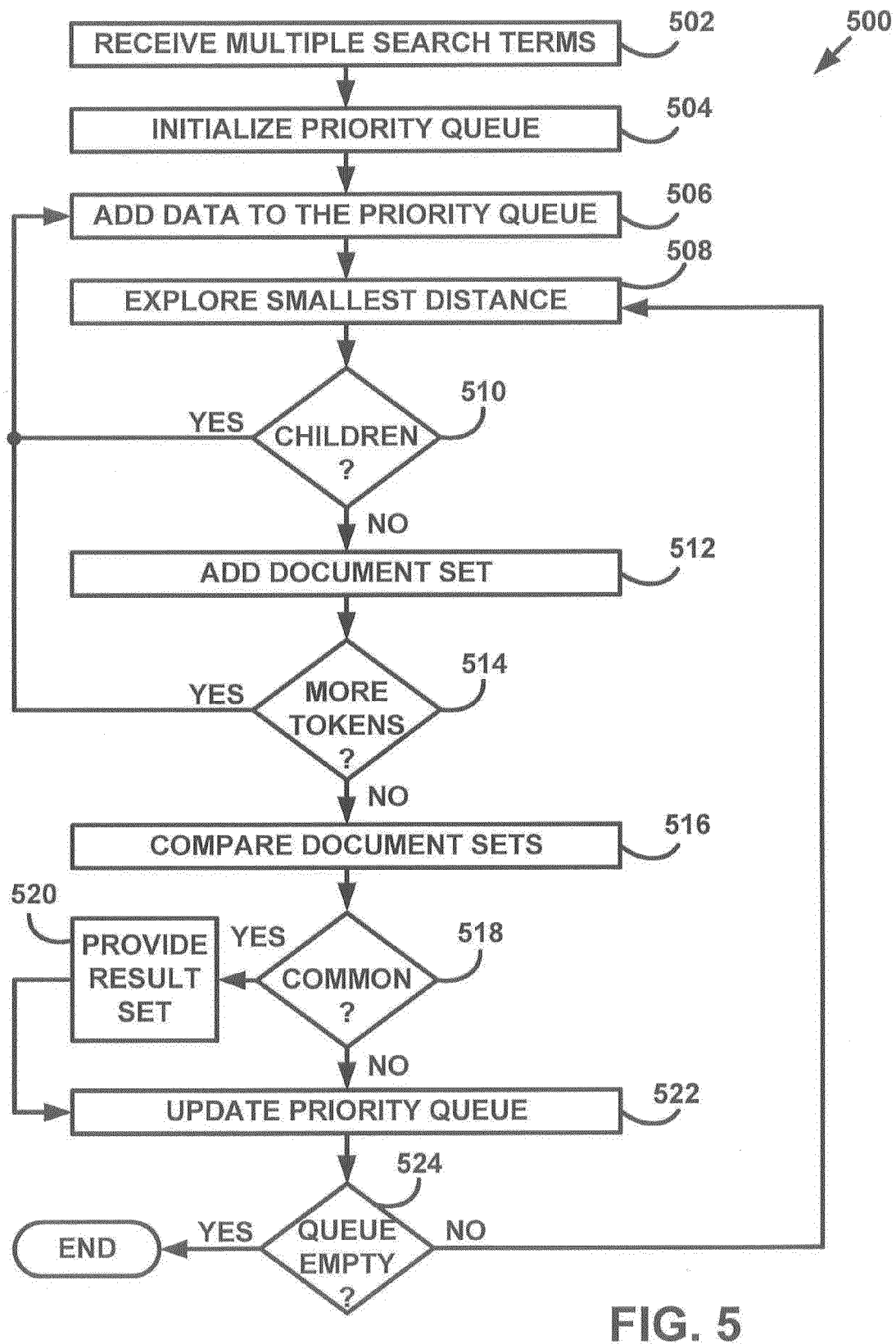
FIG. 5 is a flow diagram of a method of performing a fuzzy full text search with multiple search tokens using the fuzzy full text search system depicted in FIG. 1, according to an example.

FIG. 5 is a flow diagram of a method 500 of performing a fuzzy full text search with multiple tokens using the fuzzy FTS system 104. At block 502, the fuzzy FTS system 104 receives multiple search tokens. For example, a user enters the terms OTTO and VOLKER into the computing platform 100.

At block 504, the fuzzy FTS system 104 initializes the priority queue 116. Alternatively, the fuzzy FTS system 104 initializes the priority queue 116 prior to receiving the search tokens. For example, the fuzzy FTS system 104 may initialize the priority queue 116 upon completion of the previous search. With initialization, the query processing 114 stores in the priority queue 116, an overall edit distance value of zero and, for each entered token, the root node and an edit distance of zero.

In the example of two search tokens, the priority queue 116 now includes the following data. In this example, the number one refers to the first token and the number two refers to the second token. The priority queue 116 may be expanded for any number of entered tokens.

| OVERALL DISTANCE | NODE 1 | DISTANCE 1 | NODE 2 | DISTANCE 2 |
|---|---|---|---|---|
| 0 | ROOT | 0 | ROOT | 0 |

At block 506, the query processing 114 adds data to the priority queue 116. Initially, the query processing 114 explores the paths in the index 112 from the root node to the children nodes of the root node for the first search token. The query processing 114 places each of the nodes in the priority queue 116 with an associated edit distance from the first search token. For subsequent tokens, the query processing 114 initially adds the root node and an edit distance of zero.

The query processing 114 adds the edit distances for the tokens to obtain the overall edit distance. Initially, only the first token is associated with an edit distances so the overall edit distances are the same as the edit distances from the first token. The nodes are ordered in the priority queue 116 from smallest overall edit distance to largest overall edit distance.

Using the example depicted in FIG. 3, the query processing 114 inserts the nodes and edit distances for the first search token into the priority queue 116 as follows.

| OVERALL DISTANCE | NODE 1 | DISTANCE 1 | NODE 2 | DISTANCE 2 |
|---|---|---|---|---|
| 0 | O | 0 | ROOT | 0 |
| 1 | 1 | 1 | ROOT | 0 |
| 1 | 4 | 1 | ROOT | 0 |
| 1 | B | 1 | ROOT | 0 |
| 1 | G | 1 | ROOT | 0 |
| 1 | K | 1 | ROOT | 0 |
| 1 | N | 1 | ROOT | 0 |
| 1 | S | 1 | ROOT | 0 |
| 2 | 39 | 2 | ROOT | 0 |
| 2 | VOL | 2 | ROOT | 0 |
| 3 | CITY | 3 | ROOT | 0 |
| 3 | USA | 3 | ROOT | 0 |

At block 508, the query processing 114 explores paths from the nodes in the priority queue 116 having the smallest overall edit distance. At block 510, the query processing 114 determines whether the nodes with the smallest edit distance have children nodes. In this example, the O node has the smallest edit distance and it has two children nodes, the TO node and the TTO node.

If there are children nodes, the query processing 114 returns to block 506, removes the parent node entry, and adds the children nodes and edit distances to the priority queue 116. The children nodes are added to the priority queue 116 in order of smallest overall edit distance to largest overall edit distance. In this example, the priority queue 116 now includes the following data.

| OVERALL DISTANCE | NODE 1 | DISTANCE 1 | NODE 2 | DISTANCE 2 |
|---|---|---|---|---|
| 0 | TTO | 0 | ROOT | 0 |
| 1 | TO | 1 | ROOT | 0 |
| 1 | 1 | 1 | ROOT | 0 |
| 1 | 4 | 1 | ROOT | 0 |
| ... | ... | ... | ... | ... |
| 2 | VOL | 2 | ROOT | 0 |
| 3 | CITY | 3 | ROOT | 0 |
| 3 | USA | 3 | ROOT | 0 |

At block 508, the query processing 114 explores paths from the nodes in the priority queue 116 having the smallest edit distance, which is the node TTO in this example. At block 510, the query processing 114 determines whether the nodes with the smallest edit distance have children nodes. In this example, the TTO node is not connected to a child node. Instead, the TTO node is connected to a leaf node.

At block 512, the query processing 114 replaces the TTO node with the document set stored at the connected leaf node. In this example, the leaf node connected to the OTTO node includes the document set containing document identifier 1. The priority queue 116 now includes the following data, where the angled brackets < > include the document identifiers in the document set.

| OVERALL DISTANCE | NODE 1 | DISTANCE 1 | NODE 2 | DISTANCE 2 |
|---|---|---|---|---|
| 0 | <1> | 0 | ROOT | 0 |
| 1 | TO | 1 | ROOT | 0 |
| 1 | 1 | 1 | ROOT | 0 |
| 1 | 4 | 1 | ROOT | 0 |
| ... | ... | ... | ... | ... |
| 2 | VOL | 2 | ROOT | 0 |
| 3 | CITY | 3 | ROOT | 0 |
| 3 | USA | 3 | ROOT | 0 |

At block 514, the query processing 114 determines whether there are additional tokens. At this point, "More Tokens?" determines whether the priority queue 116 still includes the ROOT node from initialization for a token. In this example, there are two search tokens so the query processing 114 returns to block 506 to add data to the priority queue 116. For the document set entered at block 512, the query processing 114 adds the children nodes of the root node and the edit distances for the second token (e.g., VOLKER) in the priority queue 116. The children nodes are added to the priority queue 116 in order of smallest edit distance to largest edit distance.

The query processing 114 adds the edit distances for the tokens to obtain the overall edit distances. If necessary, the query processing 114 reorders the priority queue 116 in order of smallest overall edit distance to largest overall edit distance. In this example, the priority queue 116 now includes the following data.

| OVERALL DISTANCE | NODE 1 | DISTANCE 1 | NODE 2 | DISTANCE 2 |
|---|---|---|---|---|
| 0 | <1> | 0 | VOL | 0 |
| 1 | <1> | 0 | 1 | 1 |
| 1 | <1> | 0 | 4 | 1 |
| 1 | <1> | 0 | B | 1 |
| 1 | <1> | 0 | G | 1 |
| 1 | <1> | 0 | K | 1 |
| 1 | <1> | 0 | N | 1 |
| 1 | <1> | 0 | O | 1 |
| 1 | <1> | 0 | S | 1 |
| 2 | <1> | 0 | 39 | 2 |
| 3 | <1> | 0 | USA | 3 |
| 4 | <1> | 0 | CITY | 4 |
| 1 | TO | 1 | ROOT | 0 |
| 1 | 1 | 1 | ROOT | 0 |
| 1 | 4 | 1 | ROOT | 0 |
| ... | ... | ... | ... | ... |
| 2 | VOL | 2 | ROOT | 0 |
| 3 | CITY | 3 | ROOT | 0 |
| 3 | USA | 3 | ROOT | 0 |

At block 508, the query processing 114 explores paths from the nodes in the priority queue 116 having the smallest edit distance, which is the VOL node in this example. At block 510, the query processing 114 determines whether the nodes with the smallest edit distance have children nodes. In this example, the VOL node has three children nodes, the GER node, the KER node, and the VO node.

If there are children nodes, the query processing 114 returns to block 506, removes the parent node entry, and adds the children nodes and associated edit distances to the priority queue 116. The children nodes are added to the priority queue 116 in the order of the smallest edit distance to largest edit distance. The query processing 114 adds the edit distances for the tokens to obtain the overall edit distances. If necessary, the query processing 114 reorders the priority queue 116 in order of smallest overall edit distance to largest overall edit distance. In this example, the priority queue 116 now includes the following data.

| OVERALL DISTANCE | NODE 1 | DISTANCE 1 | NODE 2 | DISTANCE 2 |
|---|---|---|---|---|
| 0 | <1> | 0 | KER | 0 |
| 1 | <1> | 0 | GER | 1 |
| 1 | <1> | 0 | 1 | 1 |
| 1 | <1> | 0 | 4 | 1 |
| ... | ... | ... | ... | ... |
| 2 | VOL | 2 | ROOT | 0 |
| 3 | <1> | 0 | VO | 3 |
| 3 | CITY | 3 | ROOT | 0 |
| 3 | USA | 3 | ROOT | 0 |

At block 508, the query processing 114 explores paths from the nodes in the priority queue 116 having the smallest edit distance, which is the node KER in this example. At block 510, the query processing 114 determines whether the nodes with the smallest edit distance have children nodes. In this example, the KER node is not connected to a child node. Instead, the KER node is connected to a leaf node.

At block 512, the query processing 114 replaces the KER node with the document set stored at the connected leaf node. In this example, the leaf node connected to the KER node includes the document set containing document identifier 3. The priority queue 116 now includes the following data.

| OVERALL DISTANCE | NODE 1 | DISTANCE 1 | NODE 2 | DISTANCE 2 |
|---|---|---|---|---|
| 0 | <1> | 0 | <3> | 0 |
| 1 | <1> | 0 | GER | 1 |
| 1 | <1> | 0 | 1 | 1 |
| ... | ... | ... | ... | ... |
| 2 | VOL | 2 | ROOT | 0 |
| 3 | <1> | 0 | VO | 3 |
| 3 | CITY | 3 | ROOT | 0 |
| 3 | USA | 3 | ROOT | 0 |

At block 514, the query processing 114 determines whether there are additional tokens. At this point, "More Tokens?" also determines whether the priority queue 116 still includes the ROOT node from initialization for a token. In this example, there are no additional tokens. At block 516, the query processing 114 compares document sets for the tokens. At this point, a document set is located in the node column for each token. In this example, the query processing 114 compares the document set including document identifier 1 and the document set including document identifier 3.

At block 518, the query processing 114 determines if there are common document identifiers. Because there are not any common document identifiers, at block 522, the query processing 114 updates the priority queue 116. To update the priority queue 116, the query processing 114 removes the entry in the priority queue 116 whose document sets were compared at block 518. In this example, the priority queue 116 now includes the following data.

| OVERALL DISTANCE | NODE 1 | DISTANCE 1 | NODE 2 | DISTANCE 2 |
|---|---|---|---|---|
| 1 | <1> | 0 | GER | 1 |
| 1 | <1> | 0 | 1 | 1 |
| ... | ... | ... | ... | ... |
| 2 | VOL | 2 | ROOT | 0 |
| 3 | <1> | 0 | VO | 3 |
| 3 | CITY | 3 | ROOT | 0 |
| 3 | USA | 3 | ROOT | 0 |

At block 524, the query processing 114 determines whether the priority queue 116 is empty. If the priority queue 116 is empty, the query processing 114 ends. The query processing 114 may also end based on search threshold values. For example, the query processing 114 may end after a certain number of documents identifiers have been provided. As another example, the query processing 114 may end after a threshold edit distance is reached.

In this example, the priority queue 116 is not empty so the query processing 114 returns to block 508 to explore paths from the nodes in the priority queue 116 having the smallest edit distance. In this example, the query processing 114 explores the paths from the GER node, determines that the GER node is connected to the leaf node associated with a document set containing document identifier 1.

At block 512, the query processing 114 replaces the GER node with the document set stored at the connected leaf node. The priority queue 116 now includes the following data.

| OVERALL DISTANCE | NODE 1 | DISTANCE 1 | NODE 2 | DISTANCE 2 |
|---|---|---|---|---|
| 1 | <1> | 0 | <1> | 1 |
| 1 | <1> | 0 | 1 | 1 |
| ... | ... | ... | ... | ... |
| 2 | VOL | 2 | ROOT | 0 |
| 3 | <1> | 0 | VO | 3 |
| 3 | CITY | 3 | ROOT | 0 |
| 3 | USA | 3 | ROOT | 0 |

At block 514, the query processing 114 determines whether there are additional tokens. At this point, "More Tokens?" determines whether the priority queue 116 includes a node (not a document set) for a token. As there are document sets for each of the tokens, at block 516, the query processing 114 compares document sets for the tokens. In this example, the query processing 114 compares the document set including document identifier 1 and the document set including document identifier 1.

At block 518, the query processing 114 determines that there are common document identifiers. In this example, the common document is document identifier 1. At block 520, the query processing 114 provides a result set. The result set includes a list of common document identifiers and the associated overall edit distance. In this example, the result set includes document identifier 1 and an overall edit distance of one.

The query processing 114 provides the result set to another entity, which may then retrieve the documents associated with the document identifiers in the result set. Alternatively, the fuzzy FTS system 104 may also have the programming to retrieve and provide the documents. The documents may be stored on the computing platform 100 or another system.

A document identifier may have been previously provided during a previous iteration through the priority queue 116. In this scenario, the query processing 114 does not provide the document identifier. If there is only one common document identifier, then the query processing 114 does not provide an output. If there are multiple common document identifiers, then the query processing 114 provides only those common document identifiers that have not been previously provided.

After providing the result set at block 520, the query processing 114 updates the priority queue 116 by removing the entry in the priority queue 116 whose document sets were compared at block 518. The query processing 114 then continues to block 524 as previously described.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A computer-implemented method for performing fuzzy full text search, comprising:
   receiving a search term;
   initializing a priority queue by storing a first node and an edit distance of zero in the priority queue, wherein the priority queue comprises entries for each node in an inverted token next valid character tree that track the edit distance between the nodes and the search term;
   exploring paths of the inverted token next valid character tree from the first node to children nodes of the first node:
   if there are children nodes, removing the first node from the priority queue by deleting an entry for the first node in the priority queue;
   storing the children nodes and associated edit distances to the search term in the priority queue, wherein the children nodes are stored in the priority queue in an order of smallest edit distance to largest edit distance;
   exploring paths of the inverted token next valid character tree from the child node having the smallest edit distance to the search term; and
   in response to the path from the child node ending at a leaf node, providing a result set of document identifiers stored at the leaf node.

2. The method of claim 1, wherein if the path from the child node ends at a second child node, adding the second child node and an associated edit distance to the search term to the priority queue.

3. The method of claim 2, further comprising removing the child node and the associated edit distance from the priority queue.

4. The method of claim 1, wherein the result set includes the edit distance from the child node to the search term.

5. The method of claim 1, wherein the search term is a geographic destination.

6. The method of claim 5, further comprising:
   providing a list of geographic destinations associated with the result set of document identifiers to a navigation system.

7. A computer-implemented method, comprising:
   receiving at least a first search token and a second search token;
   for the first search token,
      initializing a priority queue by storing a root node in a priority queue;

exploring paths of an inverted token next valid character tree from a root node to children nodes of the root node;

removing the root node from the priority queue after paths to the children nodes are explored;

storing the children nodes and associated edit distances to the first search term in the priority queue, wherein the children nodes are stored in the priority queue in an order of smallest edit distance to largest edit distance;

exploring paths of the inverted token next valid character tree from the child node having the smallest edit distance to the first search term;

if the path from the child node ends at a leaf node, adding a first document set of document identifiers stored at the leaf node to the priority queue;

for the second search token, storing the children nodes of the root node and associated edit distances to the second search term in the priority queue associated with the first document set;

exploring paths of the inverted token next valid character tree from the child node having the smallest edit distance to the second search term;

if the path from the child node ends at a leaf node, adding a second document set of document identifiers stored at the leaf node to the priority queue;

comparing the first document set to the second document set;

if a document identifier is common to both the first and second document sets, adding the document identifier to a result set; and providing the result set.

8. The method of claim 7, wherein initializing the priority queue includes storing in the priority queue an overall edit distance value of zero, and for each search token, an edit distance of zero.

9. The method of claim 7, further comprising determining an overall edit distance by adding a first edit distance associated with the first document set and a second edit distance associated with the second document set.

10. The method of claim 9, further comprising providing the overall edit distance in the result set.

11. The method of claim 7, wherein if the path from the child node ends at a second child node, adding the second child node and an associated edit distance to the first or second search term to the priority queue.

12. The method of claim 7, further comprising updating the priority queue to remove an entry containing the first document set and the second document set after providing the result set.

13. The method of claim 7, further comprising if a document identifier is not common to both the first and second document sets, updating the priority queue to remove an entry containing the first document set and the second document set.

14. A fuzzy full text search system, comprising:

a processor; and memory storing an index organized as an inverted token next valid character tree, a priority queue, and query processing executable by the processor to perform a fuzzy full text search using a ranked nearest neighbor query, wherein the processor is configured to provide results to the ranked nearest neighbor query, the results including a first result set for a first edit distance to search terms and a second result set for a second edit distance to search terms, and wherein the priority queue comprises entries for each node in the inverted token next valid character tree that tracks an overall edit distance of currently explored nodes in the inverted token next valid character tree and multiple search tokens, wherein the explored nodes are stored in the priority queue in an order of smallest edit distance to largest edit distance, wherein the processor is configured to explore paths of the inverted token next valid character tree from a child node having the smallest edit distance to one of the multiple search tokens; and in response to the path from the child node ending at a leaf node, providing a result set of document identifiers stored at the leaf node.

15. The system of claim 14, wherein the priority queue tracks current position of the query processing.

16. The system of claim 14, wherein the priority queue tracks an edit distance between nodes in the inverted token next valid character tree and a search token.

* * * * *